(12) United States Patent
Ganor et al.

(10) Patent No.: US 6,384,515 B1
(45) Date of Patent: May 7, 2002

(54) MULTIDIRECTIONAL MOTORS

(75) Inventors: Ze'ev Ganor, Herzelia; Izhak Rafaeli, Haifa, both of (IL)

(73) Assignee: Nanomotion Ltd., Yokneam (IL)

( * ) Notice: Subject to any disclaimer, the term of this patent is extended or adjusted under 35 U.S.C. 154(b) by 0 days.

(21) Appl. No.: 09/807,755

(22) PCT Filed: Oct. 26, 1998

(86) PCT No.: PCT/IL98/00521

§ 371 Date: Apr. 17, 2001

§ 102(e) Date: Apr. 17, 2001

(87) PCT Pub. No.: WO00/25370

PCT Pub. Date: May 4, 2000

(51) Int. Cl.[7] .......................... H02N 2/00; H01L 41/053
(52) U.S. Cl. .............. 310/328; 310/323.16; 310/323.17
(58) Field of Search ..................... 318/116; 310/323.16, 310/323.17, 328

(56) References Cited

U.S. PATENT DOCUMENTS

| | | | | |
|---|---|---|---|---|
| 4,400,641 A | * | 8/1983 | Vishnevsky et al. ... | 310/323.17 |
| 5,085,556 A | * | 2/1992 | Ohtomi .................... | 414/744.3 |
| 5,182,484 A | * | 1/1993 | Culp ......................... | 310/328 |
| 5,237,236 A | * | 8/1993 | Culp ......................... | 310/317 |
| 5,453,653 A | | 9/1995 | Zumeris ................ | 310/323.16 |
| 5,540,615 A | * | 7/1996 | Murtuza .................... | 451/343 |
| 5,668,432 A | * | 9/1997 | Tominaga et al. ......... | 310/328 |
| 5,722,875 A | * | 3/1998 | Iwashita et al. ............... | 451/8 |
| 5,741,113 A | * | 4/1998 | Bacchi et al. ............ | 414/744.5 |
| 5,900,691 A | * | 5/1999 | Reuter et al. ............... | 310/348 |
| 6,064,140 A | * | 5/2000 | Zumeris ................ | 310/323.02 |

FOREIGN PATENT DOCUMENTS

| | | | | |
|---|---|---|---|---|
| EP | 347 846 A2 | * | 12/1989 | .......... H01L/41/08 |
| EP | 0 741 420 | | 11/1996 | .......... H01L/41/09 |
| EP | 0 755 054 | | 1/1997 | .......... G11B/19/20 |
| JP | 63-244205 | * | 10/1988 | .......... G05D/3/00 |
| JP | 10-160402 | * | 6/1998 | .......... G01B/5/20 |

* cited by examiner

Primary Examiner—Thomas M. Dougherty
(74) Attorney, Agent, or Firm—Fenster & Company Patent Attorneys, Ltd.

(57) ABSTRACT

A multidirectional motor system for transmitting motion to a moveable element in at least two directions that are not collinear comprising a first motor that transmits motion to the moveable element along a direction determined by the orientation of the first motor and a second motor operable to change the orientation of said first motor.

18 Claims, 4 Drawing Sheets

MULTIDIRECTIONAL MOTORS

RELATED APPLICATIONS

The present application is a U.S. national application of PCT/IL98/00521, filed Oct. 26, 1998.

FIELD OF THE INVENTION

The invention relates to motors for providing motion to a moveable element and in particular to providing motion of a moveable element in more than one direction using motors, for example, piezoelectric motors.

INTRODUCTION

Piezoelectric motors use vibrators made of piezoelectric materials to convert electrical energy into mechanical motion. The motors are used in many and varied applications and have been designed to impart motion to moveable elements in, among other things, automotive fuel injectors, videocassette recorders, automatic cameras, computer disc drives, and precision microscope stages.

Most piezoelectric motors generally impart motion to moveable elements to which they are coupled back and forth along a single straight line, hereinafter referred to as an "axis of motion". To impart motion to a moveable element along more than one axis of motion, generally a different piezoelectric motor is coupled to the moveable element for each different axis of motion desired.

Modem devices often comprise many small intricate parts that move with different forms of motion and in many different directions with respect to each other. These devices often have limited room available for a plurality of motors to effect these motions. It would be advantageous to have a piezoelectric motor that can by itself impart motion to a moveable element to which it is coupled along different axes of motion.

SUMMARY OF THE INVENTION

Aspects of preferred embodiments of the present invention relate to providing a piezoelectric motor, hereinafter referred to as a "multidirectional motor", that can impart motion to a moveable element along a plurality of axes of motion.

In a preferred embodiment of the present invention a multidirectional motor comprises first and second piezoelectric motors. The first motor, hereinafter referred to as a "driving motor", is coupled to a moveable element and imparts motion to the moveable element back and forth along an axis of motion. The direction of the axis of motion is determined by the orientation of the driving motor with respect to the moveable element. The second motor, hereinafter referred to as a "steering motor", is coupled to the first motor. Activation of the steering motor changes the orientation of the first motor with respect to the moveable element and thereby the axis of motion along which the first motor imparts motion to the moveable element.

Whereas the driving motor and the steering motor are described as being piezoelectric motors it should be realized that the steering motor can be any suitable motor or actuator, such for example an electromagnetic motor, a gas driven motor or a solenoid, appropriately coupled to control the orientation of the driving motor. Furthermore, the driving motor can be any motor that is friction coupled to the moveable element so as to impart motion to the moveable element.

There is therefore provided in accordance with a preferred embodiment of the present invention a multidirectional motor system for transmitting motion to a moveable element in at least two directions that are not collinear, comprising: a first motor that is coupled to the moveable element and transmits motion to the moveable element along a direction determined by the orientation of the first motor; a second motor operable to change the orientation of the first motor. Preferably, the first motor is friction coupled to the moveable element and presses on a surface region of the moveable element.

Preferably, the second motor is operable to rotate the first motor around an axis through a point on the surface region of the moveable element on which the first motor presses.

Preferably, the multidirectional motor system comprises a frame in which the first motor is mounted and the second motor is operable to rotate the frame about the axis, which frame comprises at least one support that prevents the first motor from rotating with respect to the frame about the axis.

The frame preferably comprises a circularly cylindrical surface having an axis of revolution that coincides substantially with the axis and wherein the second motor presses on the cylindrical surface and is operable to rotate the cylindrical surface.

In some preferred embodiments of the present invention the cylindrical surface has an azimuthal extent about the axis of rotation that is substantially equal to 180°. In some preferred embodiments of the present invention, the cylindrical surface has an azimuthal extent substantially equal to 360°.

In some preferred embodiments of the present invention the at least one support is connected to the cylindrical surface.

In some preferred embodiments of the present invention the frame comprises a planar mounting plate having two parallel planar surfaces that are perpendicular to the axis of rotation and the cylindrical surface is fixed to a planar surface on one side of the mounting plate and the first motor is fixed to the frame on the other side of the mounting plate. In some preferred embodiments of the present invention the cylindrical surface is convex. In other preferred embodiments of the present invention the cylindrical surface is concave.

In some preferred embodiments of the present invention the frame comprises a planar mounting plate having two parallel planar surfaces, the axis passes through the mounting plate and is perpendicular to the planar surfaces and the second motor presses on one of the planar surfaces and is operable to rotate the mounting plate around the axis.

Additionally or alternatively, the first motor comprises a piezoelectric motor. Additionally or alternatively, the second motor comprises a piezoelectric motor.

There is further provided in accordance with a preferred embodiment of the present invention a method of transmitting motion to a moveable element along a plurality of directions comprising: friction coupling a first motor to the moveable element by pressing a first motor to a surface region of the moveable element, which first motor transmits motion to the moveable element along a direction that is determined by the orientation the first motor; and changing the orientation of the first motor.

Preferably, changing the orientation of the first motor comprises using a second motor to change the orientation of the first motor. Using the second motor preferably comprises using the second motor to rotate the first motor about an axis substantially perpendicular to the surface region.

Additionally or alternatively, the first motor is a piezoelectric motor. Additionally or alternatively, the second motor is a piezoelectric motor.

The invention will be more clearly understood by reference to the following description of preferred embodiments thereof read in conjunction with the figures attached hereto. In the figures identical structures, elements or parts which appear in more than one figure are labeled with the same numeral in all the figures in which they appear.

DETAILED DESCRIPTION OF PREFERRED EMBODIMENTS

Figure 1A:
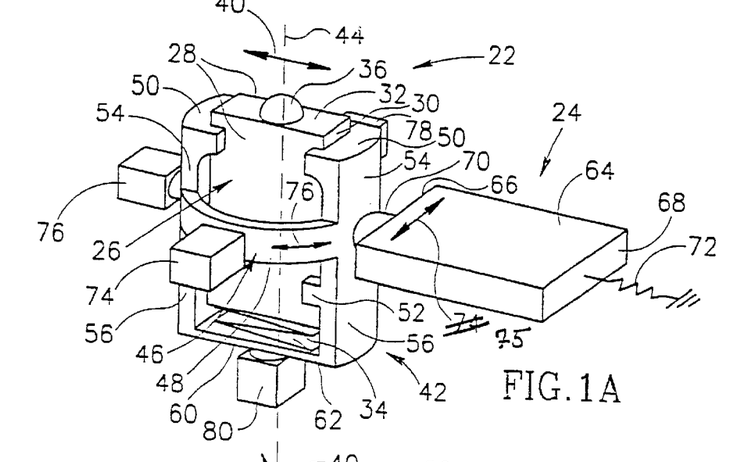
FIGS 1A–1C schematically show a multidirectional motor oriented to impart motion to a moveable element along different axes of motion, in accordance with a preferred embodiment of the present invention.
Figure 1B:
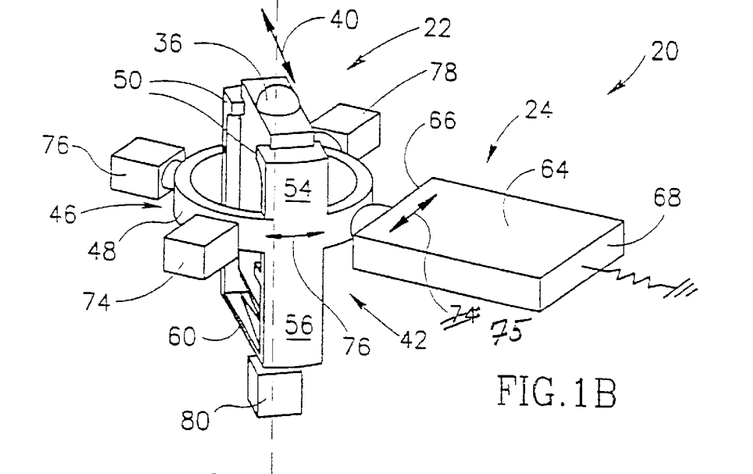
Figure 1C:
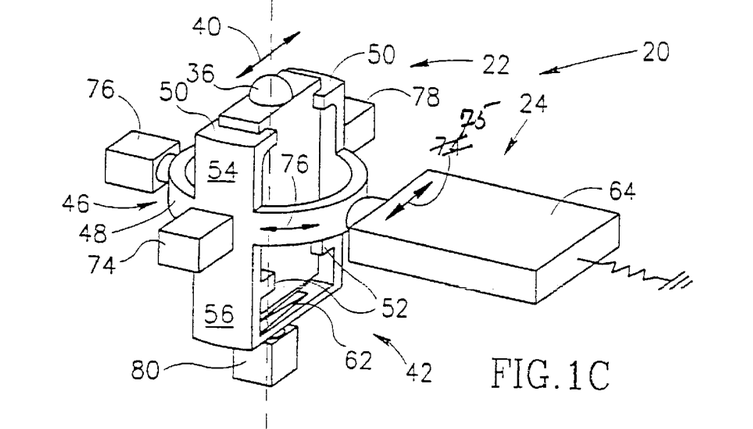

FIGS. 1A–1C schematically show a multidirectional motor 20 oriented to impart motion to a moveable element along different axes of motion, in accordance with a preferred embodiment of the present invention. Sizes of elements and components of multidirectional motor 20 are not necessarily to scale and the relative dimensions of the elements and components have been chosen for clarity of presentation.

Referring to FIG. 1A, multidirectional motor 20 comprises a driving piezoelectric motor 22 and a steering piezoelectric motor 24. Driving motor 22 is used to impart motion to a moveable element to which multidirectional motor 20 is coupled and steering motor 24 is used to determine the direction of an axis of motion along which the motion is imparted.

Driving motor 22 preferably comprises a thin rectangular plate 26 formed from an appropriate piezoelectric material having two relatively large planar face surfaces 28 (only one of which is shown in FIG. 1A). Piezoelectric plate 26 has long side edge surfaces 30 (a portion of one of side edge surfaces 30 and only an edge of the other is shown in FIG. 1A) and short top and bottom edge surfaces 32 and 34 respectively (only an edge of bottom edge surface 34 is shown in FIG. 1). Preferably, a friction nub 36 is located on top edge surface 32 for coupling vibratory motion of piezoelectric plate 26 to a moveable element. Friction nub 36 is preferably formed from a wear resistant material such as alumina. Preferably, driving motor 22 is a motor of a type described in U.S. Pat. No. 5,453,653, to Zumeris et al, or in European Publication EP 0 755 054, which are incorporated herein by reference. Piezoelectric plate 26 is controlled to vibrate by applying AC voltages to electrodes (not shown) located on face surfaces 28 of piezoelectric plate 26 as described in the cited references.

Vibrations in piezoelectric plate 26 cause friction nub 36 to vibrate with a motion, generally elliptical, that lies substantially in a plane parallel to face surfaces 28. As a result, driving motor 22 is controllable to impart motion to a moveable element to which friction nub 36 is pressed substantially only along either of the two directions indicated by a double arrow line 40. Double arrow line 40 passes through the region of contact between friction nub 36 and the moveable element and is parallel to the planes of face surfaces 28. The direction of double arrow line 40 defines an axis of motion of multidirectional motor 20. Double arrow line 40 is hereinafter referred to as "motion line 40" of multidirectional motor 20.

Driving motor 22 is preferably mounted inside a rotation frame 42. Rotation frame 42 has an axis of rotation 44 and preferably comprises a rotation collar 46 having a contact surface 48. Preferably, rotation frame 42 comprises a pair of opposing upper U brackets 50 located above rotation collar 46 and a pair of opposing lower U brackets 52 below rotation collar 46. Each upper U bracket 50 is preferably located on an upper bracket support 54 that extends upwardly from rotation collar 46. Each lower bracket 52 is preferably located on a lower bracket support 56 that extends downwardly from rotation collar 46. A base plate 60 preferably connects the ends of lower bracket supports 56.

Driving motor 22 is positioned inside rotation frame 42 so that upper and lower U brackets 50 and 52 firmly "grasp" piezoelectric plate 26 along opposite side edge surfaces 30 so as to prevent piezoelectric plate 26 from rotating with respect to rotation frame 42. Parts of upper U brackets 50 preferably press on regions of opposite side edge surfaces 30 that are substantially directly opposite each other. Similarly, parts of lower U brackets 52 preferably press on regions of opposite side edge surfaces 30 that are substantially directly opposite each other. Preferably, the regions of side edge surfaces 30 on which U brackets 50 and 52 press are located at or in the near vicinity of nodal points of a resonant vibration of piezoelectric plate 26, namely at $\frac{1}{3}$ and $\frac{2}{3}$ of the length of the plate.

Preferably, the lower bracket 50 and the upper bracket 52 that press on one of the side edge surfaces 30 are designed using methods known in the art so that parts of the brackets exert resilient forces on the side edge surface. These forces urge piezoelectric plate 26 towards the opposing upper and lower U brackets 50 and 52 respectively along the other of side edge surfaces 30, which opposing brackets preferably support piezoelectric plate 26 substantially rigidly.

Bottom edge surface 34 of piezoelectric plate 26 is preferably positioned near to base plate 60 with, preferably, a resilient biasing means 62 sandwiched between them. Resilient biasing means 62, which can be a leaf or coil spring, a layer of resilient material, or other appropriate means known in the art, resiliently urges bottom surface 34 away from base plate 60. Whereas U brackets 50 and 52 firmly grasp piezoelectric plate 26 so as to prevent rotation of driving motor 22 with respect to rotation frame 42, they are designed to enable motion of driving motor 22 parallel to axis 44. This enables biasing means 62 to resiliently maintain separation between bottom edge 34 and base plate 60. In FIG. 1A biasing means 62 is shown as a leaf spring by way of example.

Steering motor 24 is preferably similar in construction to driving motor 22. Steering motor 24 comprises a thin rectangular piezoelectric plate 64 and has top and bottom edge short surfaces 66 and 68 respectively. A friction nub 70 is preferably located on top edge surface 66. Steering motor 24 is secured in a position, using methods known in the art, so that a resilient force 72 acting on bottom surface 68 presses friction nub 70 to a region of contact surface 48 of rotation collar 46. Preferably, three bearings 74, 76 and 78 also press on rotation collar 46. Preferably, bearings 74, 76 and 78 press on contact surface 48 at azimuth angles about axis 44 that are separated by 90°. Bearing 76 preferably presses on a region of contact surface 48 of rotation collar 46 that is directly opposite the region of contact surface 48 on which friction nub 70 presses. A bearing 80 preferably presses on the center of base plate 60. Steering motor 24, bearings 74, 76, 78 and 80 are appropriately mounted in a suitable support frame (not shown) using methods known in the art so that their relative positions are accurately fixed with respect to axis 44 and so that axis 44 is fixed with respect to the support frame.

The location of bearings 74, 76, 78 and 80 enable steering motor 24 to accurately rotate rotation frame 42 about axis 44 and fix the orientation of the plane of driving motor 22 so that motion line 40 points along any azimuth angle about axis 44. Steering motor 24 thereby determines the directions along which driving motor 22 imparts motion to a moveable element to which friction nub 36 is pressed.

Electrical contact to electrodes of driving motor 22 that are electrified to excite vibrations of piezoelectric plate 26 are made through appropriate sliding contacts situated on rotation frame 42 using methods known in the art. These contacts assure that electrical contact with the electrodes exists for all orientations of rotation frame 42.

When steering motor 24 is dormant, frictional forces between friction nub 70 and contact surface 48 prevent rotation collar 46 from moving and as a result, the orientation of the plane of driving motor 22 and motion line 40 is fixed. When steering motor 24 is activated, it is controllable so that friction nub 70 exerts force on rotation collar 46 along either one of the two directions indicated by double arrow 75. The force generates a torque that rotates rotation frame 42 so that the plane of driving motor 22 and motion line 40 can be rotated in either the rotation of rotation frame 42 are indicated by double arrow line 76.

FIGS. 1B and 1C show rotation frame 42 driving motor 22 and axis of motion 44 rotated with respect to the positions of rotation frame 42 driving motor 22 and axis of motion 44 respectively shown in FIG. 1A.

Multidirectional motor 20 is coupled to a moveable element by positioning multidirectional motor so that friction nub 44 is resiliently pressed to an appropriate surface region of the moveable element by biasing means 62. In order to rotate rotation frame 42, torque generated by steering motor 24 must be sufficient to overcome frictional forces between friction nub 36 and the region to which friction nub 36 is pressed. These frictional forces generate torque that opposes torque generated by steering motor 24. It should be recognized that this requirement is relatively easily met. Force applied to rotation collar 46 by steering motor 24 acts on a lever arm about axis 44 that is much larger than any lever arm about axis 44 on which frictional forces between friction nub 36 and the moveable element operate.

Figure 2A:
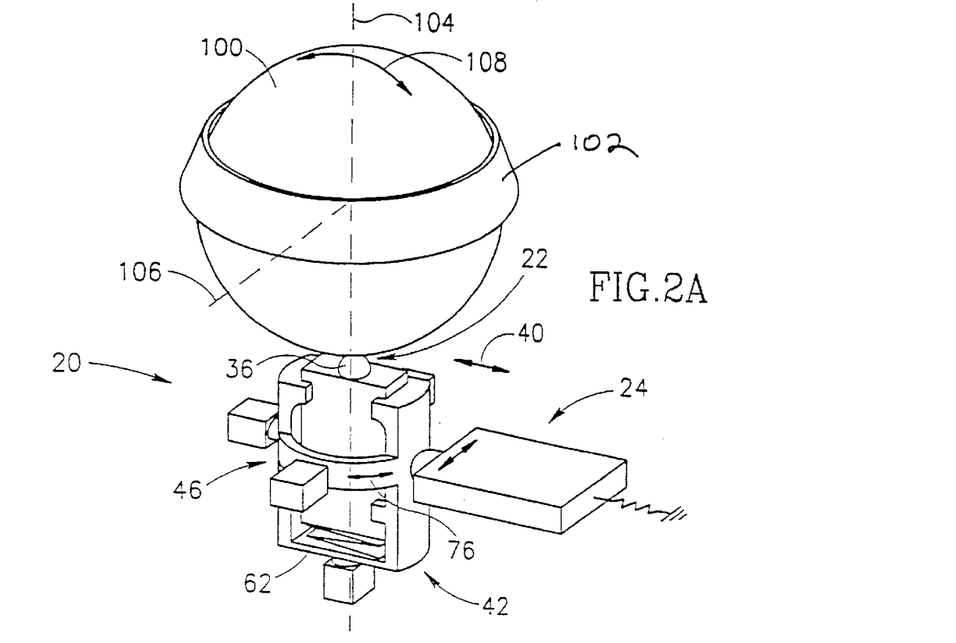
FIGS. 2A–2B schematically show the multidirectional motor shown in FIGS. 1A–1C rotating a sphere about different axes of rotation, in accordance with a preferred embodiment of the present invention.
Figure 2B:
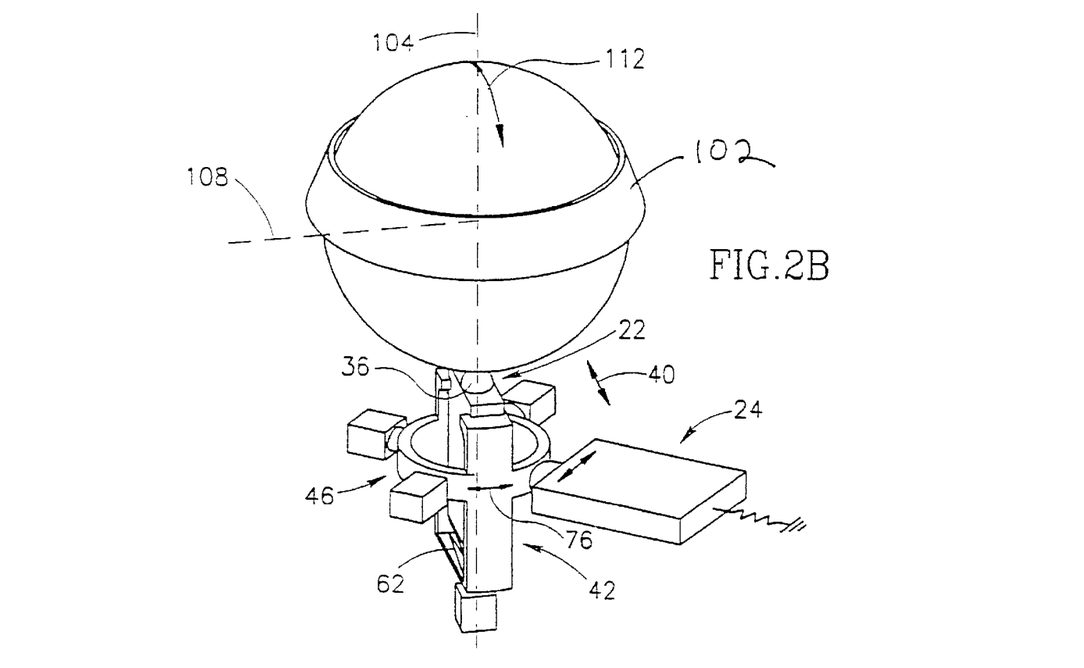

FIGS. 2A–2B schematically show a sphere 100 held between a ring bearing 102 and multidirectional motor 20 shown in FIGS. 1A–1C so that multidirectional motor 20 is controllable to rotate sphere 100 in different directions, in accordance with a preferred embodiment of the present invention.

Referring to FIG. 2A, ring bearing 102 has an axis of rotation 104 that passes through the center of sphere 100. Multidirectional motor 20 is positioned so that axis of rotation 44 (shown in FIGS, 1A–1C) of rotation collar 46 is coincident with axis of rotation 104 of ring bearing 102 and so that friction nub 36 is resiliently pressed to the surface of sphere 100 by biasing means 62. Preferably, force that friction nub 36 exerts on sphere 100 presses the surface of sphere 100 to appropriate bearings (not shown) on the inside surface of ring bearing 102. The bearings enable sphere 100 to rotate around any axis through the center of the sphere. Multidirectional motor 20 and ring bearing 102 are preferably mounted in a suitable structure so as to maintain their relative positions.

When driving motor 22 is activated, sphere 100 rotates around an axis through the center of sphere 100 that is perpendicular to axis 104 and motion line 40 of driving motor 22. In FIG. 2A axis 106 is perpendicular to axis 104 and motion line 40. When activated, driving motor 22 rotates sphere 100 clockwise or counterclockwise around axis 106 and the surface of sphere 100 moves along one of the corresponding directions indicated by double arrow line 108.

Steering motor 24 is controllable to rotate motion line 40 to any azimuth about axis of rotation 104. Multidirectional motor 20 is thereby controllable to rotate sphere 100 about any axis through the center of sphere 100 that is perpendicular to axis of rotation 104. FIG. 2A shows multidirectional motor 20 after driving motor 24 has rotated rotation frame 42 clockwise 45° about axis 104 (or 315° counterclockwise about axis 104). Now when driving motor 22 is activated sphere 100 rotates around axis 110 and the surface of sphere 100 moves in one of the directions indicated by double arrow line 112. It should be realized that when steering motor 24 rotates driving motor 22 sphere 100 will tend to rotate in the direction that driving motor rotates. If necessary this can be prevented by incorporating an appropriate braking mechanism that prevents sphere 100 from moving when steering motor 24 rotates driving motor 22.

It should be note that whereas sphere 100 is shown being held by one ring bearing 102 to which sphere 100 is pressed by force exerted by friction nub 36, other configurations for holding sphere 100 and coupling it to a multidirectional motor, in accordance with a preferred embodiment of the present invention, are possible and advantageous. For example, it is possible to maintain the position of sphere 100 with respect to friction nub 36 using three bearings in place of ring bearing 102. A different orientation for ring bearing 102 other than that shown in FIGS. 2A and 2B is also possible in certain circumstances. For example, ring bearing 102 may be placed under the sphere if the weight of sphere 100 is large enough, and the use to which the sphere is applied always permits the weight of the sphere to be supported by ring bearing 102. In other configurations, sphere 100 can be held between two ring bearings. Other possibilities will occur to persons of the art.

Figure 3A:
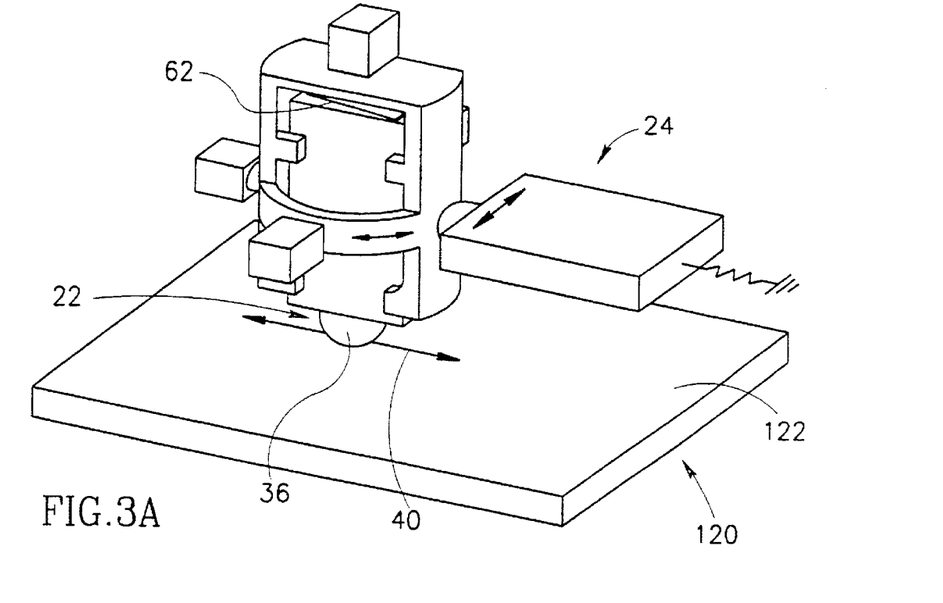
FIGS. 3A–3B schematically show the multidirectional motor of FIGS. 1A–1C moving a motion stage along different axes of motion, in accordance with a preferred embodiment of the present invention.
Figure 3B:
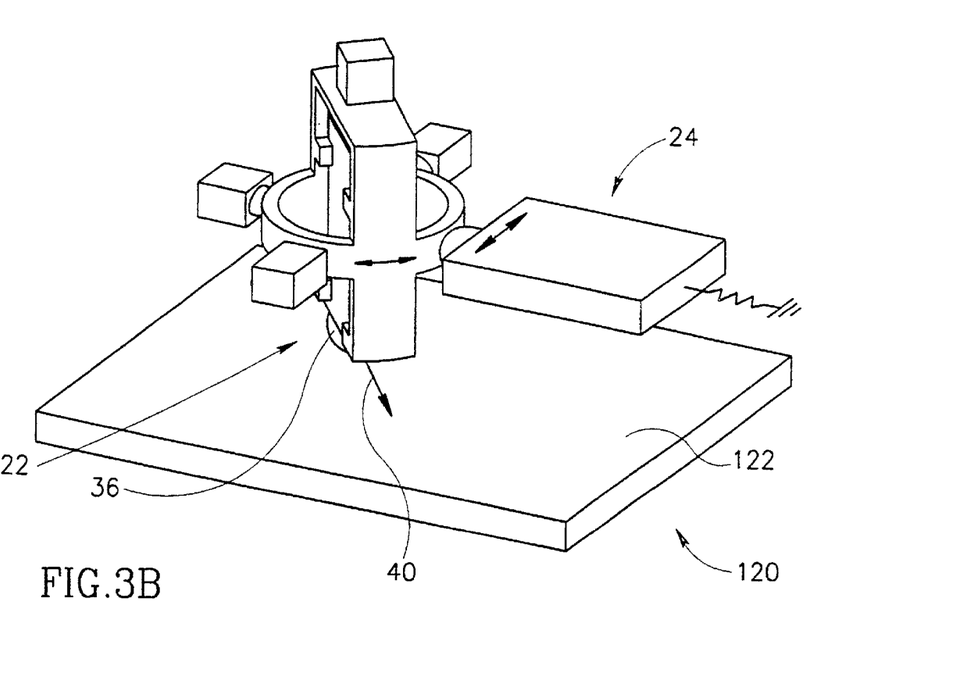

FIGS. 3A–3B schematically show multidirectional motor 20 coupled to a motion stage 120 having a surface 122 so as to move motion stage 120 in any direction parallel to surface 122. Motion stage 120 is appropriately supported by any of the many methods known in the art so that it is movable in any direction parallel to surface 122. As in the case with sphere 100, in the case of motion stage 120, multidirectional motor 20 is positioned with friction nub 36 in contact with surface 122 so that biasing means 62 is compressed and maintains friction nub 36 resiliently pressed to surface 122. Driving motor 22 is controllable to move motion stage 120 backwards or forwards along motion line 40 and steering motor 24 rotates motion line 40 to any desired azimuth about axis 44. FIGS. 1A and 1B show multidirectional motor 20 oriented to move motion stage 120 backwards or forwards along two different orientations of motion line 40. Whereas in general a motor coupled to move a motion stage is coupled to the motion stage on a bottom surface of the motion stage, multidirectional motor 20 is shown coupled to motion stage 120 on a top surface, surface 122, for clarity of presentation.

It should be realized that different variations of driving motor 20 are possible and advantageous and will occur to persons of the art. For example it is possible to support rotation collar 46 with two bearings instead of three. Other configurations for mounting piezoelectric plate 26 to rotation frame 42 are possible. For example, piezoelectric plate 26 can be prevented from rotating with respect to rotation frame 42 using U brackets that do not press on side edges 30 of piezoelectric plate 26. Lateral stabilization of the position of piezoelectric plate 26 parallel to face surfaces 28 in this case can be achieved with two additional pressure supports on side edges 30 that press on opposite side edges 30. Furthermore rotation frame 42 and piezoelectric plate 26 can be designed so that there is no resilient biasing means between bottom surface 34 of piezoelectric plate 26 and base plate 60 of rotation frame 42. To obtain resilient contact between friction nub 36 and a moveable element, bearing 80 can be spring loaded or a frame to which the elements of multidirectional motor 20 are mounted can be resiliently pressed to the moveable element.

Figure 4:
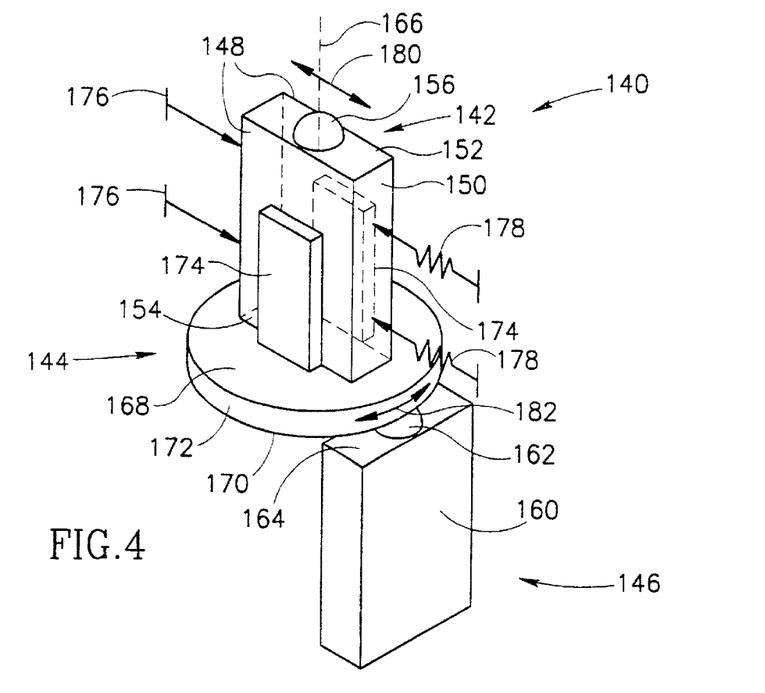
FIG. 4 schematically shows another multidirectional motor in accordance with a preferred embodiment of the present invention.

FIG. 4 shows another multidirectional motor 140 in accordance with a preferred embodiment of the present invention. Multidirectional motor 140 preferably comprises a ac driving motor 142, a rotation plate 144 and a steering motor 146. Driving motor 142 and steering motor 146 are preferably of the same type as shown in multidirectional motor 20 shown in FIGS. 1A–1C. Driving motor 142 has face surfaces 148, side edges 150 and top and bottom edge surfaces 152 and 154 respectively. Top edge surface 152 preferably has a friction nub 156 for coupling vibratory motion of driving motor 142 to a movable element. Similarly, steering motor 146 has face surfaces 160 (only one of which is shown) and preferably a friction nub 162 mounted on a short top edge surface 164 of steering motor 146. Friction nubs 156 and 162 are preferably made of wear resistant material such as alumina. Rotation plate 144 is preferably circular and has an axis of rotation 166, a top surface 168, a bottom surface 170 and an edge surface 172.

Driving motor 142 is preferably mounted to rotation plate 144 between two constraining plates 174 that are fixed to top surface 168 of rotation plate 144 so that driving motor 142 does not rotate with respect to rotation plate 144. (Constraining plate 174 that lies behind driving motor 142 in the perspective of FIG. 4 is shown in dashed lines.) Driving motor 142 is secured against lateral motion parallel to rotation plate 144 by two rigid supports 176 and two resilient supports 178 that urge driving motor 142 towards rigid supports 176. In some versions of multidirectional motor 140, bottom surface 154 of driving motor 142 is contiguous with top surface 168 of rotation plate 144. Preferably however, a biasing means is sandwiched between bottom surface 154 of driving motor 142 and top surface 168 of rotation plate 144. In variations with a biasing means, rigid and resilient supports 176 and 178 are designed to enable motion of driving motor 142 perpendicular to surface 168 of rotation plate 144 but not parallel to the plate.

Driving motor 142 is positioned so that the center of friction nub 156 is located on axis 166. A motion line 180 parallel to face surfaces 148 of driving motor 142 indicates the axis of motion along which driving motor 142 imparts motion to a moveable element to which friction nub 156 is resiliently pressed.

Steering motor 146 and rotation plate 144 are preferably mounted to an appropriate mounting frame (not shown), using methods known in the art, so that rotation plate 144 is free to rotate about axis 166 and so that friction nub 162 of steering motor 146 is resiliently pressed to bottom surface 170 of rotation plate 144. Preferably, friction nub 162 is pressed to bottom surface 170 close to edge 172 of rotation plate 144. Face surfaces 148 of steering motor 142 are preferably parallel to the tangent to edge 172 at the point on edge 172 that is closest to the point at which friction nub 162 contacts bottom surface 170. Preferably, bottom surface 170 is clad in a wear resistant coating in those regions where friction nub 162 contacts bottom surface 170. In variations of multidirectional motor 140, rotation plate 144 is made sufficiently large so that steering motor 146 and driving motor 142 can be positioned on the same side of rotation plate 144 and friction nub 162 is pressed to top surface 168.

The orientation of motion line 180 is controlled by steering motor 146 which is controllable to rotate rotation plate 144 about axis 166, preferably, in either of the directions indicated by double arrow line 182.

Multidirectional motor 140 is coupled to a moveable element by resiliently pressing the mounting frame that holds driving motor 142 to the moveable element so that friction nub 156 resiliently presses on an appropriate surface of the moveable element. In variations of multidirectional motor 140 in which a resilient biasing means is sandwiched between top surface 168 of rotation plate 144 and bottom edge surface 154 of driving motor 142, the frame of multidirectional motor 140 may be positioned rigidly with respect to the moveable element. In this case the biasing means serves to resiliently press friction nub 156 to the moveable element.

Figure 5:
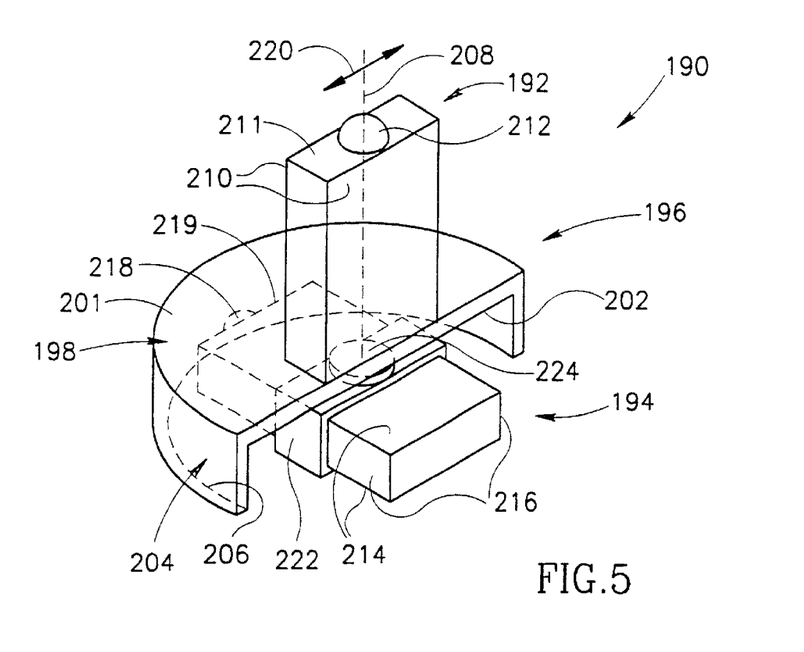
FIG. 5 schematically shows another multidirectional motor in accordance with a preferred embodiment of the present invention.

FIG. 5 shows another multidirectional motor 190 in accordance with a preferred embodiment of the present invention. Multidirectional motor 190 comprises a driving motor 192, a steering motor 194 and a rotation platform 196. Rotation platform 196 comprises a mounting plate 198 having a top surface 200 and a bottom surface 202. Components and features of multidimensional motor 190 and parts of components and features of multidimensional motor 190 that are covered by mounting plate 198 in the perspective of FIG. 5 are shown in dashed lines.

A thin circularly cylindrical plate 204, hereinafter referred to as a "coupling apron 204" extends downward from bottom surface 202 of mounting plate 198. Coupling apron 204 has an inner contact surface 206 having a radius of curvature and an axis of rotation 208 perpendicular to and passing through a point of mounting plate 198. Preferably, coupling apron 204 has an azimuthal extent about axis 208 substantially equal to 180°.

Driving motor 192 and steering motor 194 are preferably similar in construction to driving motor 22 and steering motor 24 comprised in multidirectional motor 20 shown in FIGS. 1A–1C. Driving motor 192 has face surfaces 210 and preferably comprises a friction nub 212 mounted on a short top edge surface 211. Steering motor 194 has face surfaces 214 long edges surfaces 216 and preferably comprises a friction nub 218 on a short top edge surface 219.

Driving motor 192 is mounted to rotation platform 196 on upper surface 200 of rotation platform 196 with face surfaces 210 perpendicular to upper surface 200 and with the center of friction nub 208 located on axis 208. Driving motor 192 is mounted so that it does not rotate about axis 208 with respect to mounting platform 196 preferably using methods described above, variations thereof or other methods known in the art. A motion line 220 parallel to face surfaces 210 and edge surface 211 of driving motor 192 indicates the axis of motion along which driving motor 192 imparts motion to a moveable element to which friction nub 220 is pressed.

Steering motor 194 is held by a mounting collar 222 that is attached to bottom surface 202 of mounting plate 198 by a "lazy Suzan" bearing 224. Lazy Suzan bearing 224 enables mounting collar 222 to rotate freely about axis 208 with respect to rotation platform 196. Face surfaces 214 of steering motor 194 are held accurately parallel to mounting plate 198 by lazy Suzan bearing 224 and mounting collar 222. Mounting collar 222 is designed so that steering motor 194 can move linearly relative to mounting collar 222 in a direction parallel to the long edges of edge surfaces 216 but is substantially prevented from rotating with respect to mounting collar 222 about axis 208. A radius of rotation of coupling surface 206 that passes through the center of friction nub 218 passes through or very close to axis 208. Steering motor 192 is resiliently urged towards contact surface 206 along a direction parallel to the long edges of edge surfaces 216 using methods known in the art so that friction nub 218 presses on contact surface 206 Contact surface 206 is preferably clad with a wear resistant material.

Multidirectional motor 190 is coupled to a moveable element by resiliently urging mounting collar 222 along axis 208 towards an appropriate surface of the moveable element so as to press friction nub 212 to the surface. An appropriate frame (not shown) that accurately maintains the orientation of mounting collar 222 and axis 208 fixed with respect to the moveable element supports mounting collar 222.

Driving motor 190 is controllable to impart motion to the moveable element in the two directions indicated by motion line 220. Steering motor 194, when activated, imparts motion to coupling apron 204 so as to rotate rotation platform 196 clockwise or counter clockwise about axis 208 and thereby to rotate motion line 220. The azimuthal range over which steering motor 194 rotates motion line 220 is determined by the azimuthal extent of coupling apron 206. Since driving motor 192 is controllable to impart motion to the moveable element along either of the two directions indicated by motion line 220, multidirectional motor 190 is controllable to impart motion to the moveable element over a range of azimuths that is twice as large as the azimuthal extent of coupling apron 206.

In accordance with a preferred embodiment of the present invention, coupling apron 206 has an azimuthal extent greater than 180°. As a result, steering motor 194 can rotate motion line 220 through a 180° angle. Driving motor 192 can therefore impart motion to the moveable element in any azimuthal direction in a 360° range about axis 208, i.e. in any direction about axis 208. (It should be noticed that in order to obtain a full 180° range of rotation for motion line 220, generally a diagonal length of face surfaces 214 of steering motor 192 must be less than twice the radius of rotation of coupling apron 204.)

By positioning steering motor 194 under driving motor 192 so that it presses on inner surface 206 of coupling apron 204, a particularly compact embodiment of the present invention is achieved. It is of course possible to couple driving motor 194 to the outside surface of coupling apron 204 and this can be advantageous.

In the claims and specification of the present application, each of the verbs, "comprise" and "include", and conjugates thereof, are used to convey that the object or objects of the verb are not necessarily a listing of all the components, elements or parts of the subject or subjects of the verb.

The present invention has been described using a non-limiting detailed description of a preferred embodiment thereof. Variations of the embodiment described will occur to persons of the art. The detailed description is provided by way of example and is not meant to limit the scope of the invention, which is limited only by the following claims.

As used in the claims, the words "comprise" or "include" or their conjugates means "including, but not necessarily limited to."

What is claimed is:

1. A multidirectional motor system for transmitting motion to a moveable element in at least two directions that are not collinear, comprising:
    a first motor that is friction coupled to the moveable element and transmits motion to said moveable element along a direction determined by the orientation of said first motor;
    a second motor operable to change the orientation of said first motor relative to said moveable element.

2. A motor according to claim 1 wherein said second motor is operable to rotate said first motor around an axis through a point in said surface region of said moveable element on which said first motor presses.

3. A multidirectional motor system according to claim 2 comprising a frame in which said first motor is mounted, wherein said second motor is operable to rotate said frame about said axis and wherein said frame comprises at least one support that prevents said first motor from rotating with respect to said frame about said axis.

4. A multidirectional motor system according to claim 3 wherein said frame comprises a circularly cylindrical surface having an axis of revolution that coincides substantially with said axis and wherein said second motor presses on said cylindrical surface and is operable to rotate said cylindrical surface.

5. A multidirectional motor system according to claim 4 wherein said cylindrical surface has an azimuthal extent about said axis of rotation that is substantially equal to 180°.

6. A multidirectional motor system according to claim 4 wherein said cylindrical surface has an azimuthal extent substantially equal to 360°.

7. A multidirectional motor system according to claim 4 wherein said at least one support is connected to said cylindrical surface.

8. A multidirectional motor system according to claim 4 comprising a planar mounting plate having two parallel planar surfaces that are perpendicular to said axis of rotation and wherein said cylindrical surface is fixed to a planar surface on one side of said mounting plate and wherein said first motor is fixed to said frame on the other side of said mounting plate.

9. A multidirectional motor system according to claim 8 wherein said cylindrical surface is convex.

10. A multidirectional motor system according to claim 8 wherein said cylindrical surface is concave.

11. A multidirectional motor system according to claim 3 wherein said frame comprises a planar mounting plate having two parallel planar surfaces wherein said axis passes through said mounting plate and is perpendicular to said planar surfaces and said second motor presses on one of said planar surfaces and is operable to rotate said mounting plate around said axis.

12. A multidirectional motor system according to claim 1 wherein said first motor comprises a piezoelectric motor.

13. A multidirectional motor system according to claim 1 wherein said second motor comprises a piezoelectric motor.

14. A method of transmitting motion to a moveable element along a plurality of directions comprising:

friction coupling a first motor to said moveable element by pressing a first motor to a surface region of said moveable element wherein said first motor transmits motion to said moveable element along a direction that is determined by the orientation said first motor; and changing the orientation of said first motor.

15. A method according to claim 14 wherein changing the orientation of said first motor comprises using a second motor to change the orientation of said first motor.

16. A method according to claim 15 wherein using said second motor comprises using said second motor to rotate said first motor about an axis substantially perpendicular to said surface region.

17. A method according to claim 14 wherein said first motor is a piezoelectric motor.

18. A method according to claim 14 wherein said second motor is a piezoelectric motor.

* * * * *